United States Patent [19]

Brumm

[11] Patent Number: 4,476,730

[45] Date of Patent: Oct. 16, 1984

[54] ORIFICE METER WITH PRESSURE VENTING AND EQUALIZING SAFETY DEVICE

[75] Inventor: Richard S. Brumm, Orinda, Calif.

[73] Assignee: Grove Valve and Regulator Company, Oakland, Calif.

[21] Appl. No.: 429,621

[22] Filed: Sep. 30, 1982

[51] Int. Cl.³ .............................................. G01F 1/42
[52] U.S. Cl. .................................... 73/861.61; 138/94
[58] Field of Search ........................ 73/861.61, 861.62; 138/44, 45, 94, 94.3

[56] References Cited

U.S. PATENT DOCUMENTS 4,370,893  2/1983  Combes ............................ 73/861.61

FOREIGN PATENT DOCUMENTS 3043279  5/1981  Fed. Rep. of Germany ... 73/861.61

*Primary Examiner*—Charles A. Ruehl
*Attorney, Agent, or Firm*—Melvin R. Stidham

[57] ABSTRACT

An orifice meter including a carrier, which is movable between two parallel body walls while maintaining sealing engagement therewith. In one position it seals around the pipeline flow passage, and in a second position it seals around an orifice disc service opening in one of the body plates. A small, axially movable valve plug in the body plate adjacent the service opening is operative in one position to equalize the pressure in the space within the carrier seals with the rest of the valve body and in a second position to vent that space to atmosphere. Interengaging means on the valve plug and a rotatable closure for the service opening prevent removal of the closure unless the valve plug is in its venting position. The valve plug has two annular grooves, each carrying an O-ring to seal against inner surfaces of axially aligned inner equalizing passage and outer vent passage. A transfer duct opens from between the two passages to the space within the service opening. Bypass ducts opening from the grooves prevent O-ring dislodgement.

12 Claims, 8 Drawing Figures

ORIFICE METER WITH PRESSURE VENTING AND EQUALIZING SAFETY DEVICE

BACKGROUND OF THE INVENTION

Natural gas is generally sold by volumetric measurement, and one way to measure the volume of a flowing gas is to pass it through an orifice of a known size and measure the pressure drop across it. An orifice meter comprises a housing within which a disc with an orifice is supported in a gas pipeline, the housing being fitted with pressure taps for measuring pressure immediately upstream and downstream of the orifice. Because the orifice is subject to wear by impacting of sand, lime scale and other foreign particles in the flowing stream, it must be replaced at frequent intervals to ensure accuracy in measurement.

In the more sophisticated type orifice meters, the orifice disc carrier is moved to a location in the housing which may be sealed off from the flow passage so that flow can continue while the orifice disc is being replaced. A closure covering an access opening in a wall of the meter housing is removed so to enable service or replacement of the orifice disc. However, if the closure is removed or loosened while the body compartment is still under pressure, serious or even catastrophic consequences may ensue.

OBJECTS OF THE INVENTION

It is an object of this invention to provide an orifice meter wherein an access door for servicing an orifice disc cannot be removed unless the chamber in which the orifice disc is contained is depressurized.

It is a further object of this invention to provide an orifice meter wherein an isolation chamber for servicing or replacement of an orifice disc can be evacuated prior to access from the exterior, and then pressure-balanced with the remainder of the valve body before being moved back into active position.

Other objects and advantages of this invention become apparent from the description to follow, particularly when read in conjuction with the accompanying drawings.

SUMMARY OF THE INVENTION

The orifice meter housing of this invention has a pair of parallel plates with a gate-like orifice disc carrier slidable between them. In one position, resilient seal rings on opposite sides of the carrier seal around the flow passages, and in a second position, the seal ring on one side seals around an access opening while the other seal ring seals against the opposite wall so that, together they form an isolated chamber exposed to the access opening. The isolated chamber is connected by a transfer duct to an adjacent flow passageway through one of the parallel plates. An axially movable valve plug is normally in an axially retracted position wherein an equalizing port is uncovered so that pressures in the isolation chamber and the remainder of the body chamber are equalized through the transfer duct. The valve plug is moved inward to close the equalizing port and open a venting port, so that the isolation chamber is vented through the transfer duct to the atmosphere. The closure for the access opening must be turned at least partially to open, as by threading it into the body plate, and an arm on the closure engages the axially movable valve plug only when it is in its normal, retracted pressure-balancing position. Hence, the closure cannot be unscrewed and opened unless and until the axially movable valve is moved inward to its pressure venting position.

DESCRIPTION OF A PREFERRED EMBODIMENT

Figures 1, 1A:
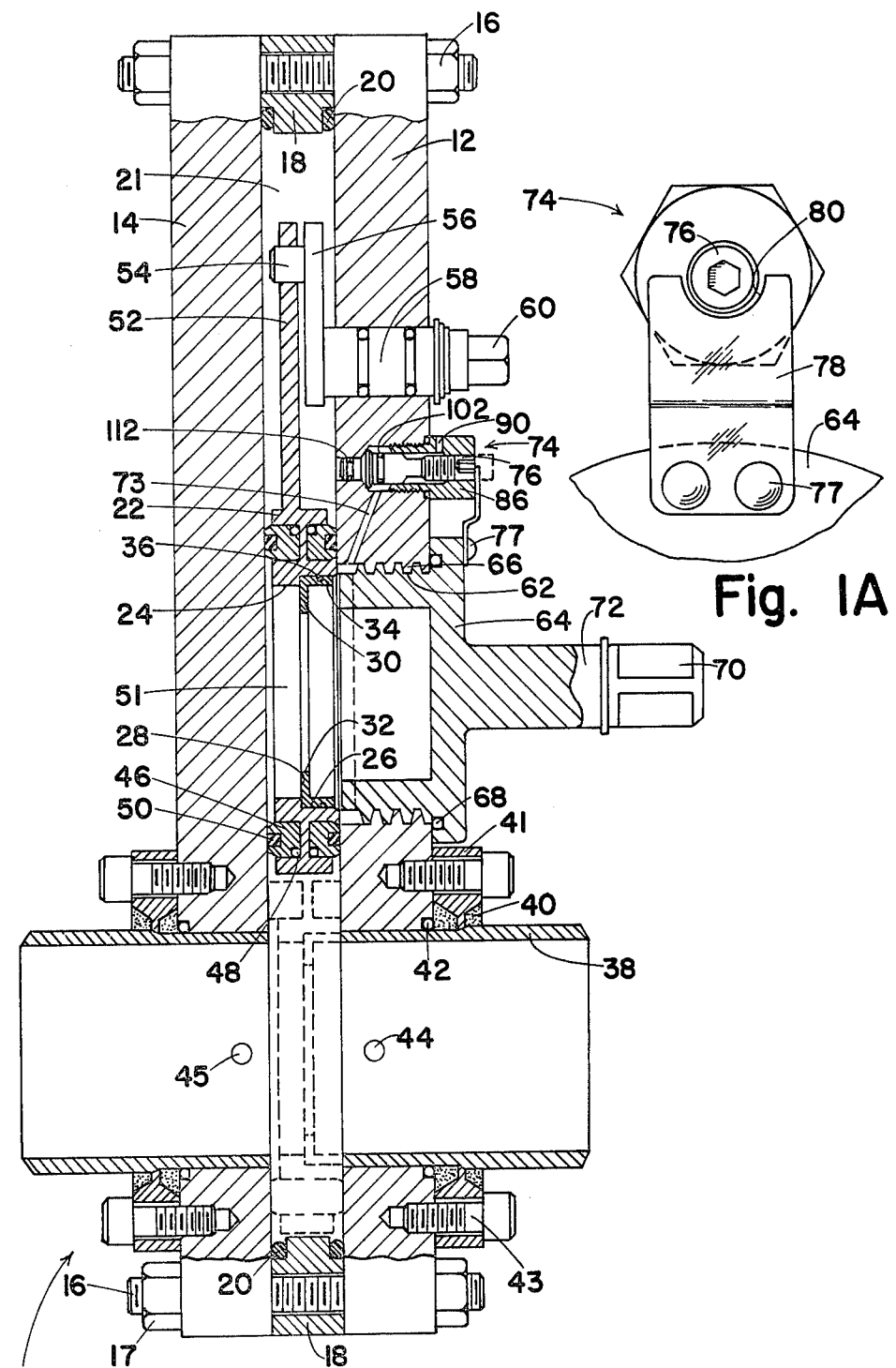
FIG. 1 is a vertical section view of an orifice meter embodying features of this invention.
FIG. 1A is an enlarged partial elevation of the safety lock means of this invention.

Referring now to FIG. 1 with greater particularity, the orifice meter 10 of this invention comprises a pair of parallel steel body plates 12 and 14, which are secured together by a plurality of bolts 16, with nuts 17 clamping the plates 12 and 14 against the edges of an oval body band 18. Resilient seal rings 20, which are carried by the body band 18 form a sealed body space enclosure 21 between the body plates 12 and 14.

Slidably carried between the parallel plates 12 and 14 is a gate-like carrier 22 which is of annular configuration with an opening 24 therethrough, counterbored at 26 to form an internal shoulder 28, against which is supported the orifice disc 30 having an orifice 32 therethrough of a predetermined size. An annular axial flange 34 on the orifice disc 30 carries a seal ring 36 to prevent the occurrence of a leak path around the orifice disc 30. The internal diameter of the axial flange 34, as well as the internal diameter of the opening 24 is substantially equal to the internal diameters of the flow tubes 38, so that when in active position shown in phantom aligned with the flow tubes 38, they form a continuation thereof.

The flow tubes 38 may each comprise a section of a pipe of predetermined diameter, which is dictated by the various factors governing flow measurement. The flow tubes 38 are welded at 40 into a mounting ring 41. The mounting ring 41 and flow tube 38 are sealed at 42 and secured to the valve plates 12 and 14, as by means of cap screws 43. Pressure taps 44 and 45 are drilled at fixed distances upstream and downstream of the orifice disc 30 so that, when the carrier 22 is in its active position shown in phantom, the pressure drop across the orifice 32 can be determined.

Carried on each side of the annular orifice disc carrier 22 is a seat ring 46 carrying a resilient outer seal 48 and a resilient main seal 50. The main seals 50 on opposite sides of the carrier 22 maintain constant sealing engagement with the valve plates 12 and 14 so that, in any position thereof, away from the flow tubes 38, the portion of the orifice carrier radially inside the main seal rings 50 constitutes an isolation chamber 51, which is sealed off from the remainder of the valve body space 21.

The orifice carrier 22 has an integral, panhandle stem 52 which is pivoted at 54 on a crank arm 56, carried on a sealed, rotatable shaft 58 with a squared end 60 for partial rotation, as by means of a suitable wrench (not shown).

Displaced from the flow passageways 38 is a service access opening 62, through which the orifice disc 30 may be serviced or replaced, when the carrier is moved into position in alignment with the opening 62, as shown in solid lines in FIG. 1. The access opening 62 is normally closed by a closure member 64, as by providing complementary, engagable Acme threads 66 on the opening 62 and closure 64. Suitable seal means, such as an O-ring 68 may be provided to prevent leakage past the threads 66. The closure 64 may be unthreaded from the opening 62, by applying a wrench to the squared end 70 of a stem 72, which is secured to, or formed integral with, the closure 64.

Closely spaced from the access opening 62, and connected to it by a transfer duct 73, is a venting and equalizing valve assembly 74, including an axially movable valve plug 76, the operation of which will be described hereinafter. Secured to the access opening closure 64 by any suitable means 77 is a lock arm 78 with a receptacle or yoke 80 (FIG. 1A) overlying the end of the axially movable valve plug 76. Hence, when the pressure venting-equalizing valve 76 is in its normal, retracted position shown in phantom in FIG. 1, it is embraced by the yoke 80 so that the closure 64 cannot be turned to unthread the closure 64 from the opening 62. It is only after the axially movable valve 76 is extended to its venting position, shown in solid lines, whereby the isolation space 51 within the carrier seals 50 is vented to atmosphere through the transfer duct 73, can the threaded closure 64 be turned to expose the space and orifice disc 30 to the access opening 62.

Figure 2:
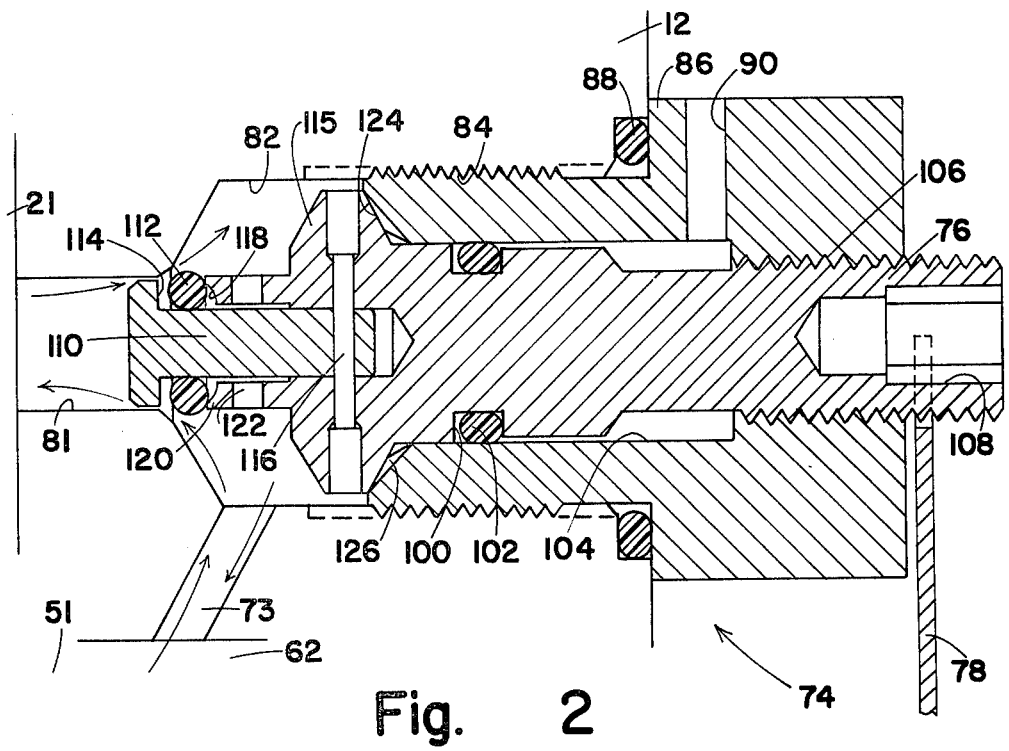
FIG. 2 is an enlarged partial section view of the axially movable valve stabilized in normal pressure equalizing position.

Referring now to FIG. 2, the pressure venting-equalizing valve 74 is shown in its normal position, as occurs while the orifice disc carrier 22 is in alignment with the flow tubes 38, as shown in phantom in FIG. 1. The pressure venting-equalizing valve 74 includes a bore 81 opening from the inside of wall plate 12 from the body space 21, and a coaxial counterbore 82 opening from the outer wall of the plate 12. The counterbore 82 is tapped at 84 to threadedly receive a valve passageway or sleeve 86, with a seal, such as an O-ring 88 preventing leakage around the sleeve 86. A generally radial venting duct or passage 90 is provided from the inside of the sleeve 86 to the atmosphere.

Formed around the axially movable valve body plug 76 is an annular groove or recess 100 in which is carried a vent seal O-ring 102. The O-ring 102 engages the inner surface 104 of the sleeve 86, so that, as long as the O-ring 102 is engaged in the sleeve 86, there can be no venting through the vent passage 90 from either the body space 21 or the confined space 51. Complementary threads 106 on the valve plug 76 and the sleeve 86 cause the valve plug 76 to be moved axially upon rotation thereof, as by means of a suitable wrench in the end socket 108.

In the normal position shown in FIG. 2, the valve plug 76 is fully retracted with an extension 110 thereon partially withdrawn from the bore 80 wherein an equalizing O-ring 112 carried in a groove or recess 114 is out of sealing engagement with the bore 81. In this position, which is defined by engagement of a collar 115 with the end of the sleeve 86, there is a pressure equalizing passage or communication between the body space 21 and the isolation space 51 formed by the duct 73 and bore 81. The groove 114 is formed by the extension 110 which is pinned at 116 to the plug to extend therefrom and the annular end 118 of the plug itself. An axial lip 120 formed on the annular end 118, and axial relief ducts or vent passages 122 both cooperate to assist in O-ring retention, as will hereinafter be described.

Figure 3:
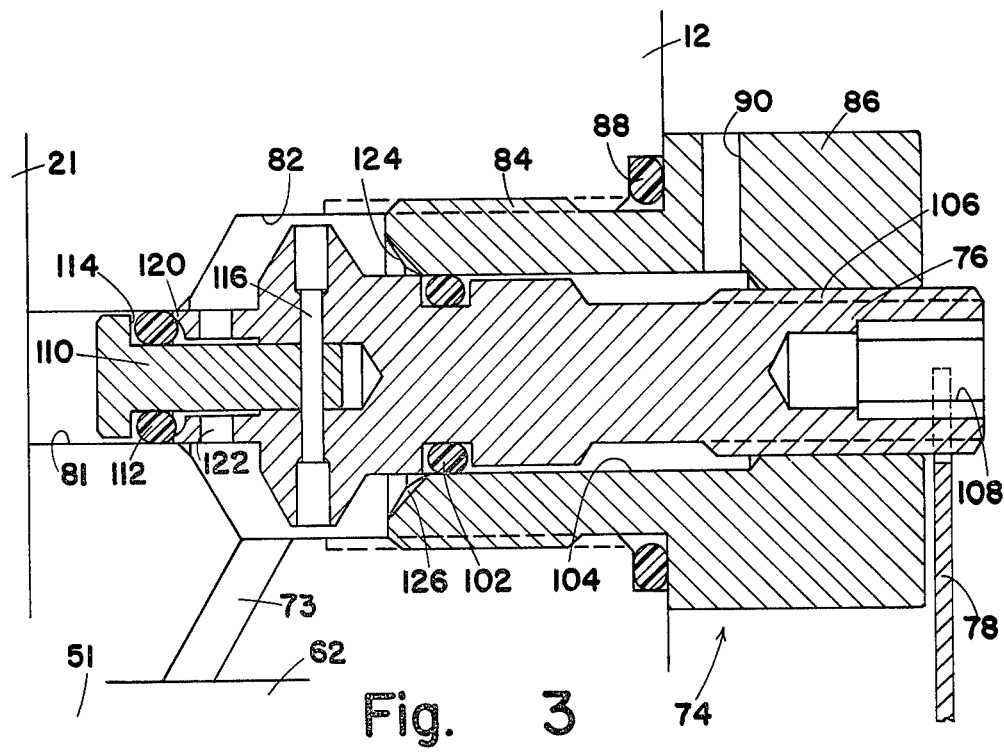
FIG. 3 is an enlarged partial section view of the valve in intermediate position.

In FIG. 3, the pressure venting-equalizing valve plug 76 is in its intermediate position with the forward extension 110 and leading O-ring seal 112 entered into the bore 81 to seal off communication from the body space 21. It is significant to note that the sealing of the bore 80 by the O-ring 112 is established before the venting O-ring 102 emerges from the inner surface 104 of the sleeve 86. Hence, the bore 81 and body space 21 are sealed off, before there can be any venting to the atmosphere through the radial passage 90 of the sleeve 86.

Figure 4:
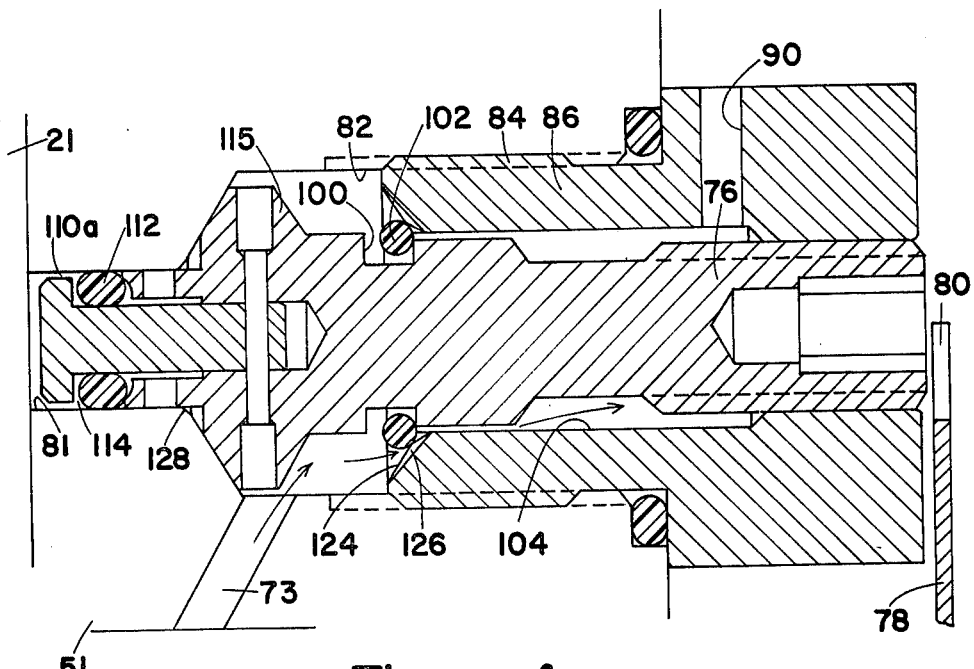
FIG. 4 is an enlarged partial section view of the valve as it moves into pressure venting position.
Figure 5:
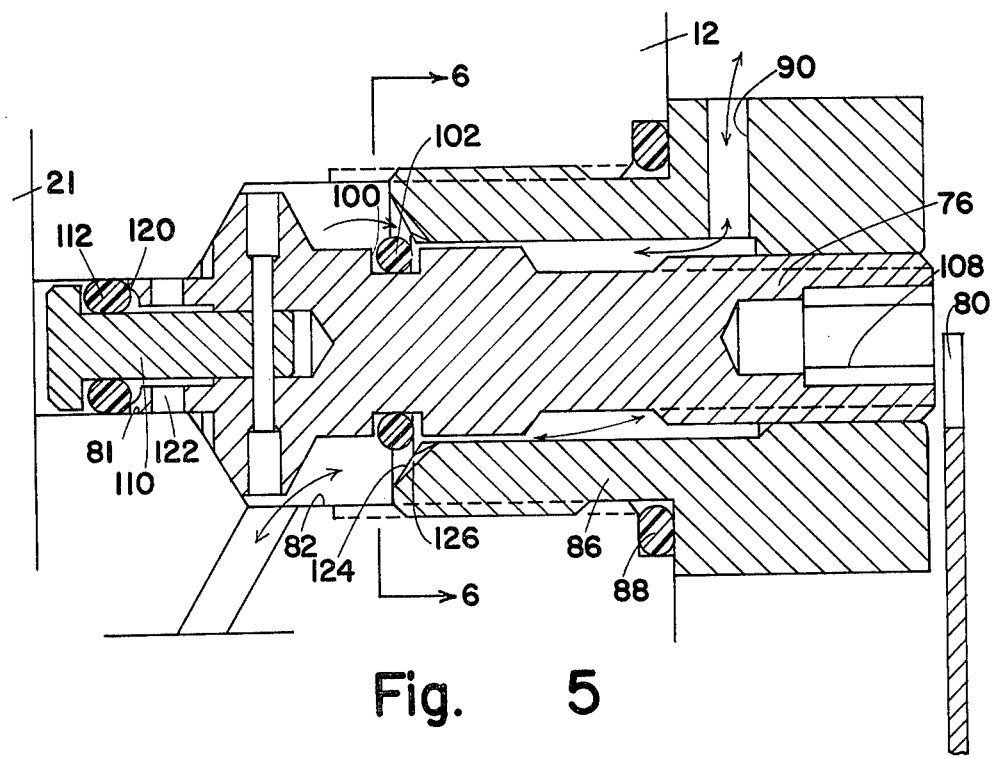
FIG. 5 is an enlarged partial section view of the valve stabilized in pressure venting position.
Figure 6:
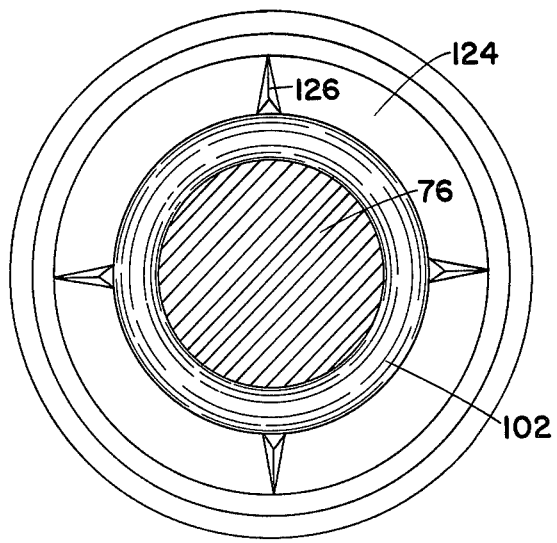
FIG. 6 is a section view taken along line 6—6 of FIG. 5.

In FIG. 4, the axially movable plug 76 has moved to a position wherein the venting O-ring 102 has fully emerged from the inner surface 104 of the sleeve 86, with the collar 115 engaging the bottom of the counterbore 82. In this position of the valve plug 76, the isolated space 51 is open to atmosphere through venting ducts 73 and 90. As the O-ring 102 just emerges from the sleeve 86, it tends to cling to the sleeve inner surface 104 and at the same time, there is a rush of pressure toward the venting passing 90 which tends to blow the O-ring 102 out of its recess 100. If any part of the O-ring remains out of the recess 100, it could be severed when the valve plug is again retracted into the sleeve 86. In order to prevent this, the end of the sleeve 86 is chamfered at 124 so that there is an internal conical surface that restricts outer radial expansion of the O-ring 102. In addition, at regular intervals around the outer surface 124, say every 90 degrees, there are Vee grooves 126 which provide a bypass for initial flow of the venting fluid toward the vent passage 90 to equalize pressures, allowing the O-ring 102 to reach a position of stability, as shown in FIG. 5, wherein venting continues to the atmosphere through the radial passage 90. It should be also noted that, in the position shown in FIG. 5, the axially movable plug 76 is free of the arm 78, enabling rotation of the threaded access opening closure 64 for service of the orifice disc 30.

Figure 7:
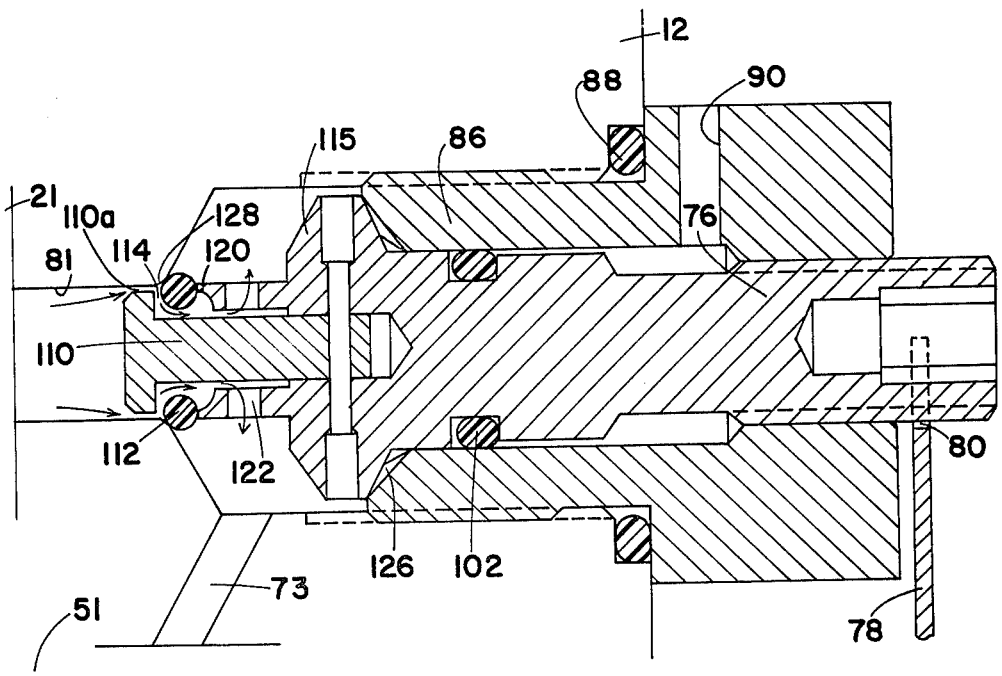
FIG. 7 is an enlarged section view as of the valve as it moves back into pressure equalizing position.

Referring now to FIG. 7, the valve 76 is shown being retracted, with the forward O-ring 112 just emerging from the bore 81. Again, there is a tendency for the O-ring both to cling to the surface of the bore 81 and to be blown from the O-ring groove 114 by the sudden rush of pressure from the body space 21 to equalize with the isolated space 51 through the passage 73. To prevent the O-ring 112 from being blown from the groove a restricting chamfer 128 is provided at the inner end of the bore 81 and the relief ducts 122 enable the fluid to bypass the O-ring 112 until it stablizes to the position shown in FIG. 1. In addition, the lip 120 around the groove 114 provides mechanical restraining means for retention of the O-ring 112. The relief ducts 122 have a total area several times greater than the clearance gap 110a around the extension 110. This greatly reduces differential pressure across the O-ring enabling it to snap back into its groove 114 under its own tension.

While this invention has been described in conjunction with a preferred embodiment thereof, it is obvious that modifications and changes therein may be made by those skilled in the art to which it relates, without departing from the spirit and scope of this invention, as defined by the claims appended hereto.

What is claimed as invention is:

1. An orifice meter comprising:
    a body including a pair of walls having aligned circular flow passages therethrough;
    a carrier movable between said walls;
    means for moving said carrier between a first position aligned with said flow passages and a second position displaced therefrom;
    an orifice disc removably carried on said carrier;
    an access opening through one of said walls aligned with said second position;
    means sealing around said access opening when said carrier is in said second position; and
    a closure member normally covering said access opening;
    said orifice meter being characterized in that:
    there are interengaging means on said closure member and said one wall which require at least partial rotation of said closure member for release thereof;
    a valve passageway through said one wall adjacent said access opening;
    a venting passage from said passageway to the exterior of said body;
    the inner end of said passageway forming an equalizing passage to the interior of said body displaced from said access opening;
    a transfer duct from said access opening to said passageway intermediate said venting and equalizing passages;
    a valve member axially movable in said passageway and operative in a first position to seal off said venting passage and open said equalizing passage, and in a second position to seal off said equalizing passage and open said venting passage; and
    means on said closure member and said valve member which are mutually engaged only when said valve member is in said first position to prevent rotation of said closure member.

2. An orifice meter defined by claim 1 being further characterized in that:
    said walls are parallel and planar;
    said means sealing around said access opening comprise annular seal means on both sides of said carrier of a diameter greater than said flow passages and operative to maintain sealing engagement with said planar walls; and
    said access opening is of a diameter greater than that of said orifice disc but less than that of said annular seal means, so that said annular seal means seal around said access opening when said carrier is in said second position.

3. The orifice meter defined by claim 1 being further characterized in that:
    said valve member, when moved from said first position to said second position, seals off said equalizing passage before unsealing said venting passage.

4. The orifice meter defined by claim 1 characterized in that the mutually engaged means therein includes:
    an arm secured to said closure member to extend generally radially therefrom to overlie said passageway; and
    a receptacle on said arm to receive said valve member when in said first position.

5. The orfice meter defined by claim 1 being further characterized in that said valve passageway comprises:
    a bore forming said equalizing passage opening from the inner surface of said one wall;
    an enlarged, coaxial counterbore opening from the outer surface of said one wall;
    a sleeve secured in said counterbore with the inner annular end thereof spaced from said bore;
    said venting passage opening from the interior of said sleeve; and wherein said valve member comprises:
    a generally cylindrical valve plug movable axially in said sleeve with an inner extension thereof slidable in said bore;
    a first seal ring around said plug to seal against the inner surface of said sleeve; and
    a second seal ring on said inner extension to seal against the inner wall of said bore.

6. The orifice meter defined by claim 5 characterized in that:
    said plug is normally in said first position protruding from said sleeve with said first seal ring in sealing engagement with said inner surface and said second seal ring withdrawn from said bore;
    said plug being movable to said second position with said second seal ring in sealing engagement with said inner wall and said first seal ring protruding beyond said inner annular end.

7. The orifice meter defined by claim 6 characterized in that the mutually engaged means therein includes:
    an arm secured to said closure member to extend generally radially therefrom over said sleeve; and
    receptacle means on said arm receiving the outer end of said valve plug only in said first, retracted position.

8. The orifice meter defined by claim 6 being further characterized in that it includes:
    a collar on and around said valve plug intermediate said first and second seal rings and engagable with the inner wall of said counterbore to define said second position.

9. The orifice meter defined by claim 5 further characterized in that:
    said first and second seal rings are of the O-ring type and including:
    first and second annular grooves around said valve plug receiving said seal rings; and
    small, generally radial grooves in said inner annular end of said sleeve to interupt sealing engagement of said first seal ring with said inner surface before it emerges fully from said sleeve during movement thereof from said first position to said second position.

10. The orifice meter defined by claim 5 further characterized in that:
    said first and second seal rings are of the O-ring type and including:
    first and second annular grooves around said valve plug receiving said seal rings; and
    small axial relief ducts in said valve plug extension from the bottom of said second annular groove to the outside of said plug intermediate said first and second seal rings.

11. The orifice meter defined by claim 10 being further characterized in that:
    the flow capacity of said axial relief ducts is greater than the clearance between said plug extension and said inner wall.

12. The orifice meter defined by claim 5 further characterized in that:

said first and second seal rings are of the O-ring type and including:
first and second annular grooves around said valve plug receiving said seal rings; and
axial relief ducts in said valve plug extension from the bottom of said second annular groove to the outside of said plug intermediate said first and second seal rings;
a lip around the outboard outer edge of said second annular groove extending toward the other outer edge of said second groove.

* * * * *